United States Patent
Struziak et al.

(10) Patent No.: US 9,470,260 B2
(45) Date of Patent: Oct. 18, 2016

(54) THRUST BEARING ASSEMBLY

(71) Applicant: Hamilton Sundstrand Corporation, Windsor Locks, CT (US)

(72) Inventors: Ronald M. Struziak, Longmeadow, MA (US); Murtuza Lokhandwalla, South Windsor, CT (US); Christopher McAuliffe, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 78 days.

(21) Appl. No.: 14/497,602

(22) Filed: Sep. 26, 2014

(65) Prior Publication Data

US 2016/0091016 A1   Mar. 31, 2016

(51) Int. Cl.
| | |
|---|---|
| F16C 17/04 | (2006.01) |
| F16C 33/08 | (2006.01) |
| F16C 33/12 | (2006.01) |
| C23F 1/00 | (2006.01) |
| F16C 43/02 | (2006.01) |
| F16C 33/10 | (2006.01) |

(52) U.S. Cl.
CPC ............ *F16C 17/042* (2013.01); *F16C 43/02* (2013.01); *F16C 33/1075* (2013.01); *F16C 2226/10* (2013.01); *F16C 2226/30* (2013.01)

(58) Field of Classification Search
CPC  F16C 17/024; F16C 27/042; F16C 33/1015; F16C 33/1075; F16C 33/108; F16C 37/002; F16C 2223/30; F16C 2226/10
USPC ....... 384/103–106, 121, 215, 223, 302, 125; 29/898.041, 898.13; 216/100
See application file for complete search history.

(56) References Cited

U.S. PATENT DOCUMENTS

| | | |
|---|---|---|
| 4,082,375 A | 4/1978 | Fortmann |
| 4,116,503 A | 9/1978 | Licht |
| 4,208,076 A | 6/1980 | Gray et al. |
| 4,213,657 A | 7/1980 | Gray |
| 4,247,155 A | 1/1981 | Fortmann |
| 4,277,111 A | 7/1981 | Gray et al. |
| 4,415,281 A | 11/1983 | Agrawal |
| 4,462,700 A | 7/1984 | Agrawal |
| 4,597,677 A | 7/1986 | Hagiwara et al. |
| 4,621,930 A | 11/1986 | Gu et al. |
| 4,624,583 A | 11/1986 | Saville et al. |
| 5,110,220 A | 5/1992 | Gu |
| 5,248,205 A | 9/1993 | Gu et al. |
| 5,318,366 A | 6/1994 | Nadjafi |
| 5,498,082 A | 3/1996 | Nadjafl |
| 5,540,505 A | 7/1996 | Struziak |

(Continued)

FOREIGN PATENT DOCUMENTS

WO    WO 2006036570 A2 *  4/2006  ............ F16C 17/024

*Primary Examiner* — Marcus Charles
(74) *Attorney, Agent, or Firm* — Kinney & Lange, P. A.

(57) ABSTRACT

A hydrodynamic thrust bearing has an annular plate, a plurality of bearing foils, and a plurality of bumper foils. The annular plate has a first face and a second face opposite the first face. The bearing foils have an arcuate shape and are joined to the first face of the annular plate. The bumper foils have an arcuate and corrugated shape and are joined to the second face of the annular plate. A method of making a hydrodynamic thrust bearing includes joining the bearing and bumper foils to the annular plate with integrally-formed spacers in which each bumper foil corresponds to a bearing foil.

20 Claims, 7 Drawing Sheets

(56) References Cited

U.S. PATENT DOCUMENTS

| | | |
|---|---|---|
| 5,547,286 A | 8/1996 | Struziak |
| 5,584,582 A | 12/1996 | Brown |
| 5,833,369 A | 11/1998 | Heshmat |
| 5,871,284 A * | 2/1999 | Nadjafi ............... F16C 27/02 384/105 |
| 5,961,217 A | 10/1999 | Heshmat |
| 6,158,892 A | 12/2000 | Stewart et al. |
| 8,147,143 B2 | 4/2012 | Struziak et al. |
| 2002/0079765 A1* | 6/2002 | Lembke ............... F16C 17/024 310/90.5 |
| 2011/0229313 A1* | 9/2011 | Beers ............... B64D 13/06 415/180 |

* cited by examiner

THRUST BEARING ASSEMBLY

BACKGROUND

This invention relates to hydrodynamic thrust bearings, and more particularly, to light-weight and reliable hydrodynamic thrust bearings used in rotating machinery.

Hydrodynamic thrust bearings rely on relative rotation between a shaft, typically referred to as the thrust runner, and a bearing to generate a non-linear fluid film between the thrust runner and the bearing. The fluid film forms when the relative rotation of the shaft and bearing interacts with the fluid to create and maintain pressurized wedges of fluid between the shaft and bearing. The pressurized fluid wedge transfers thrust or axial loads from the thrust runner to the bearing, the fluid typically being air or oil.

Each hydrodynamic thrust bearing consists of a plurality of bearing foils, also referred to as top foils, and a plurality of bumper foils. In a typical arrangement, the plurality of bearing foils and bumper foils are welded to the same side of an annular plate, the assembly forming a thrust bearing. Because thrust bearings of this type are often relatively thin, the welding process can create distortions within the annular plate that inhibits fluid film formation and decreases bearing performance. Past attempts to remedy the distortion process produced thrust bearings with multiple annular plates, the bearing foils being welded to a first annular plate and the bumper foils being welded to a second annular plate. However, thrust bearings of this type have more weight and a more complex assembly process than thrust bearings without these additional anti-distortion structures.

Moreover, manufacturing processes can introduce flaws into the thrust bearing construction that reduce service life. A typical manufacturing process can involve forming bearing components with an electrical discharge machining process or EDM process. The EDM process can form burrs or a metallic crust on the machined edges of the bearing components. Left untreated, the burrs can form cracks that eventually propagate, leading to decreased service life of the thrust bearing.

Reducing weight and increasing service life of hydrodynamic thrust bearings continues to be a goal of designers and manufacturers. Therefore, a need exists to provide a light-weight, distortion-resistant design with manufacturing processes that do not hinder the service life of the hydrodynamic thrust bearing.

SUMMARY

A hydrodynamic thrust bearing has an annular plate, a plurality of bearing foils, and a plurality of bumper foils. The annular plate has a first face and a second face opposite the first face. The bearing foils have an arcuate shape and are joined to the first face of the annular plate. The bumper foils have an arcuate and corrugated shape and are joined to the second face of the annular plate.

A method of making a hydrodynamic bearing includes forming an annular plate with spacers attached to a first face of the annular plate, forming a plurality of arcuate bearing foils, and forming a plurality of arcuate and corrugated bumper foils. The method can further include joining a plurality of bumper foils to a second face opposite the first face of the annular plate, each bumper foil corresponding to a bearing foil, and joining the plurality of bearing foils to the first face of the annular plate, each bearing foil being associated with a spacer.

DETAILED DESCRIPTION

Figure 1:
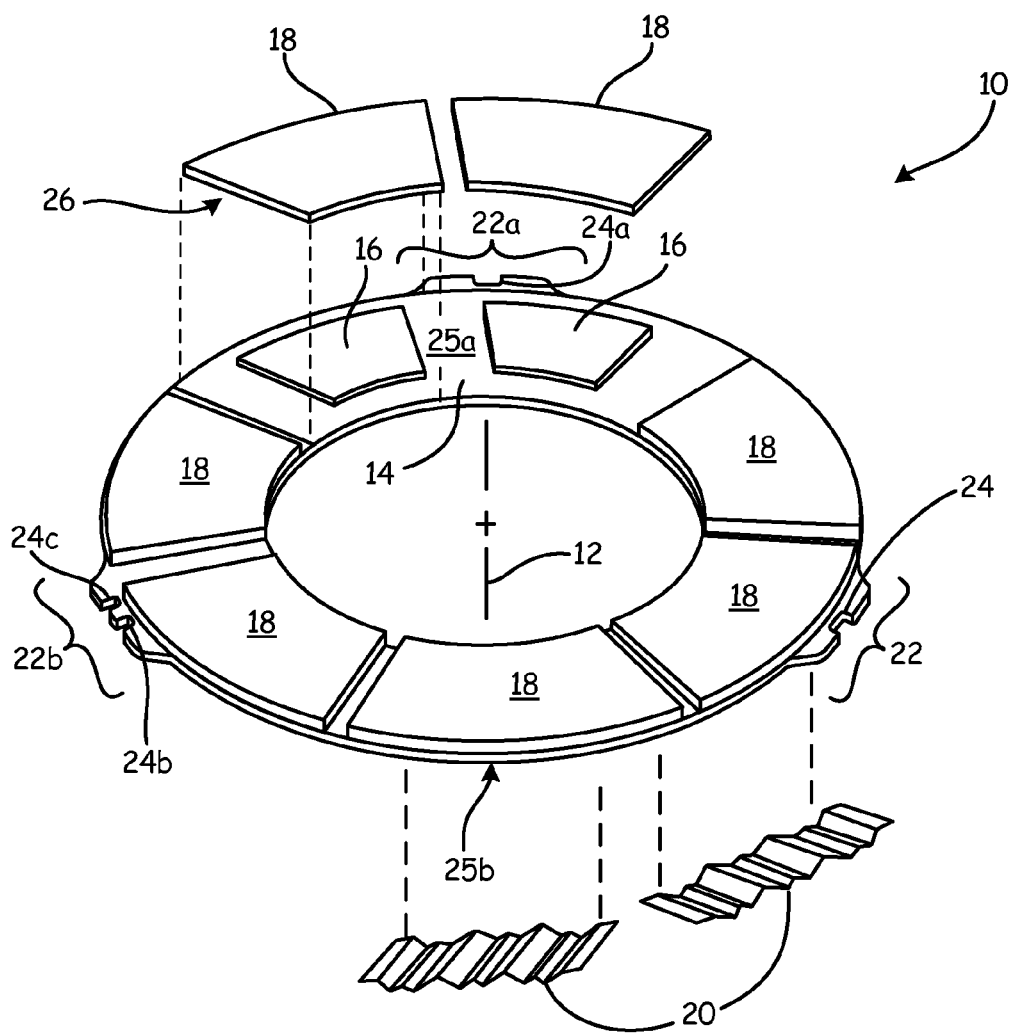
FIG. 1 is a perspective view of a thrust bearing.

FIG. 1 is a perspective view of thrust bearing 10 having axis 12 passing through the geometric center of thrust bearing 10. Axis 12 defines a frame of reference in which an axial direction is parallel with axis 12, a radial direction is perpendicular to axis 12, and a circumferential direction corresponds to an angular direction about axis 12. Thrust bearing 10 includes annular plate 14, spacers 16, bearing foils 18, and bumper foils 20. Annular plate 14 further includes attachment tabs 22, 22a, and 22b and slots 24, 24a, 24b, and 24c. Annular plate 14 provides a structure for mounting spacers 16, bearing foils 18, and bumper foils 20.

In general, bearing foil 18 and bumper foil 20 attach to opposite faces 25a and 25b of annular plate 14, and spacer 16 is arranged between bearing foil 18 and annular plate 14. Bearing foil 18 is provided with clearance between annular plate 14 and the outermost face of bearing foil 18 along radially-extending end 26 to facilitate attachment of bearing foil 18 to annular plate 14. Bearing foils 18 have clearance between adjacent bearing foils 18 that, in some embodiments, is approximate equal to 0.050 inches. Bumper foil 20 is corrugated. Spacer 16 can be a separate component attached to annular plate 14 or be integrally formed with annular plate 14. In either case, spacer 16 can be shaped to support bearing foil 18 in a manner beneficial to the formation of a hydrodynamic fluid film during the operation of thrust bearing 10. For example, spacer 16 can have a generally flat shape that cooperates with bearing foils 18 and bumper foils 20 to promote hydrodynamic wedge formation.

In the embodiment shown in FIG. 1, thrust bearing 10 has seven spacers 16, seven bearing foils 18, and seven bumper foils 20. The number of spacers 16, bearing foils 18, and bumper foils 20 depend on the size of the bearing and the particular load requirements of the bearing application; however, an odd number for each can be advantageous for detuning the bearing components from natural frequency harmonics of the rotating machine. Higher loads or larger size requirements increase the required bearing area of thrust bearing 10. As the bearing area increases, the number of spacers 16, bearing foils 18, and bumper foils 20 typically increase in order to limit the portion of the load resisted by any single group of components. In other applications, size limitations can require the number of components to be reduced. Therefore, it will be appreciated by one skilled in the art that the present invention would apply to other thrust bearings having more or less spacers and foils.

Figure 2:
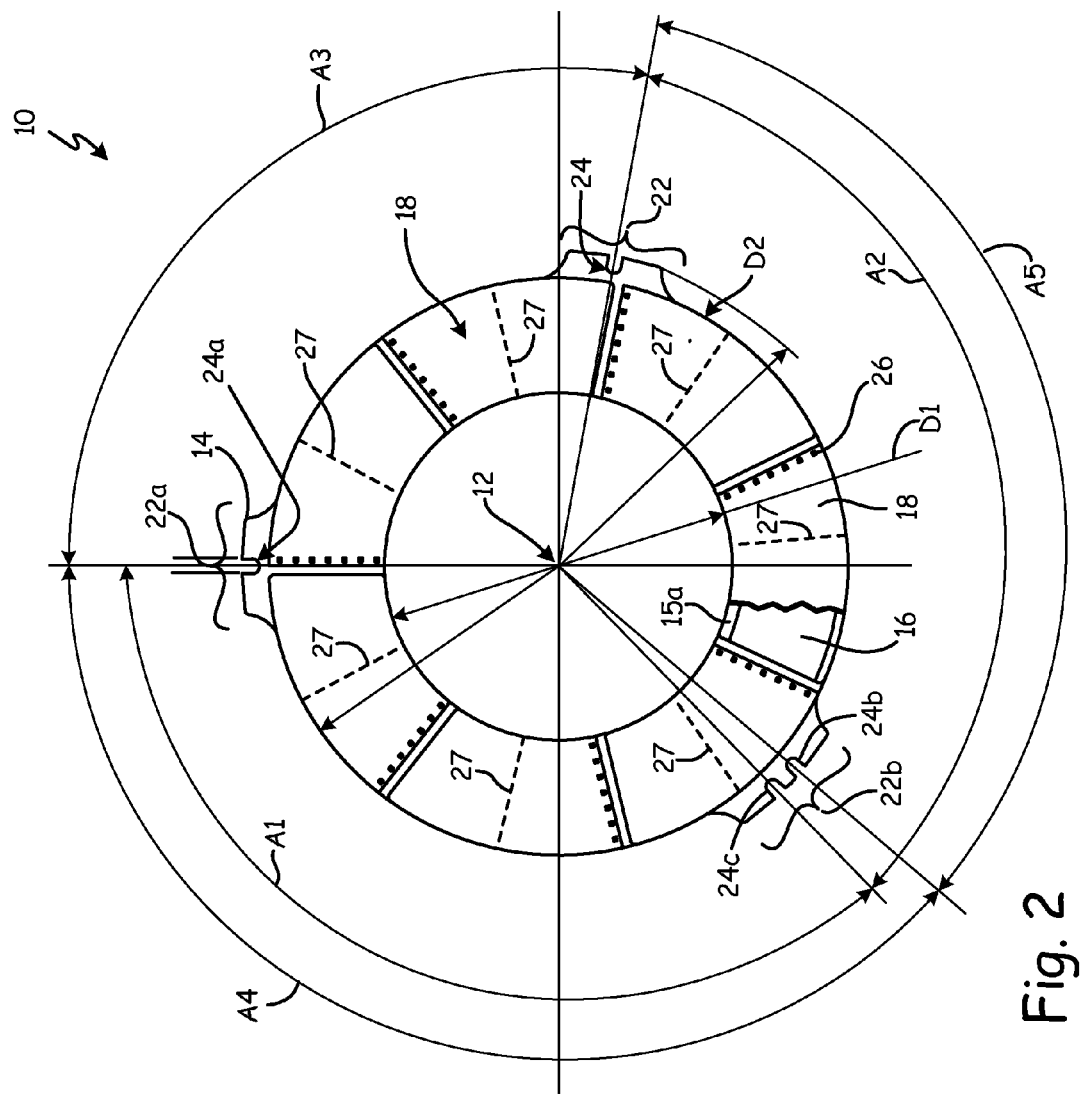
FIG. 2 is a plan view of the thrust bearing in FIG. 1 that shows the bearing foil face.

FIG. 2 is a plan view of thrust bearing 10 in which the configuration of bearing foils 18 can be better appreciated. Each bearing foil 18 has an arcuate shape defined by an inner radius, an outer radius, a thickness, and an included angle, forming a segment of an annulus having a centerline coincident with axis 12. Each bearing foil 18 has a substantially identical arcuate shape. The inner and outer radii of bearing foils 18 extend to the respective inner and outer annular edges of annular plate 14. Each bearing foil 18 is attached to annular plate 14 at a single radially-extending end 26, the circumferential load being applied such that it imposes tension on bearing foil 18. Typically, bearing foils 18 are constructed from one of several metallic materials that can withstand the temperature and structural loads imposed on thrust bearing 10 during operation. Suitable metallic materials include AMS 5598. Each bearing foil 18 is relatively thin, having a thickness greater than or equal to 0.004 inches and less than or equal to 0.006 inches, although other thicknesses could be used.

In some embodiments and as will be discussed in greater detail below, radial partition line 27 demarks a location where bearing foil 18 has a maximum axial displacement that can further cooperate with a thrust runner (not shown) to form a hydrodynamic fluid film. Each radial partition line 27 is associated with a bearing foil 18 and each radial partition line 27 intersects axis 12.

Annular plate 14 engages a stationary structure (not shown) at slots 24, 24a, 24b, and 24c embodied in attachment tabs 22, 22a, and 22b respectively. The configuration of slots 24, 24a, and 24b are adapted to mate with a particular rotating machine, whereas additional slot 24c can be used with slots 24 and 24a to mate with a different rotating machine. The spacing among slots 24, 24a, 24b, and 24c in either combination is not equal such that thrust bearing 10 can be assembled to the rotating machine in only one orientation, thereby providing a mistake-proof feature. For example, the angular spacing between slots 24, 24a, and 24b can be defined by angles A1, A2, and A3. Likewise, the angular spacing between slots 24, 24a, and 24c can be defined by angles A3, A4, and A5. In the first arrangement, A1 does not equal A3 and A2 does not equal A3 while the sum of A1, A2, and A3 equals 360 degrees. In the second arrangement, A3, A4, and A5 are not equal while the sum of A3, A4, and A5 equals 360 degrees. Because at least some of the angles are not equal in either the first or second arrangements, thrust bearing 10 can only be installed with bearing foils 18 facing away from the stationary structure (not shown). Even though the angles are not equal, it is advantageous to select angles that are within plus or minus 20 degrees of an average angle such that slots 24, 24a, and 24b and slots 24, 24a, and 24c are roughly equally spaced. Such spacing allows for the circumferential load to be more evenly distributed among slots 24, 24a, and 24b (or 24c). For example, three slots, as shown in FIG. 2, can reduce the portion of circumferential load each slot 24, 24a, and 24b resists, and therefore, it will be appreciated by persons skilled in the art that annular plate 14 can have more than three slots 24, 24a, and 24b. Attachment tabs 22, 22a, and 22b are sized to accommodate slots 24, 24a, 24b, and 24c, the dimensions of attachment tabs 22, 22a, and 22b being selected using engineering practices well known in the art.

Figure 3:
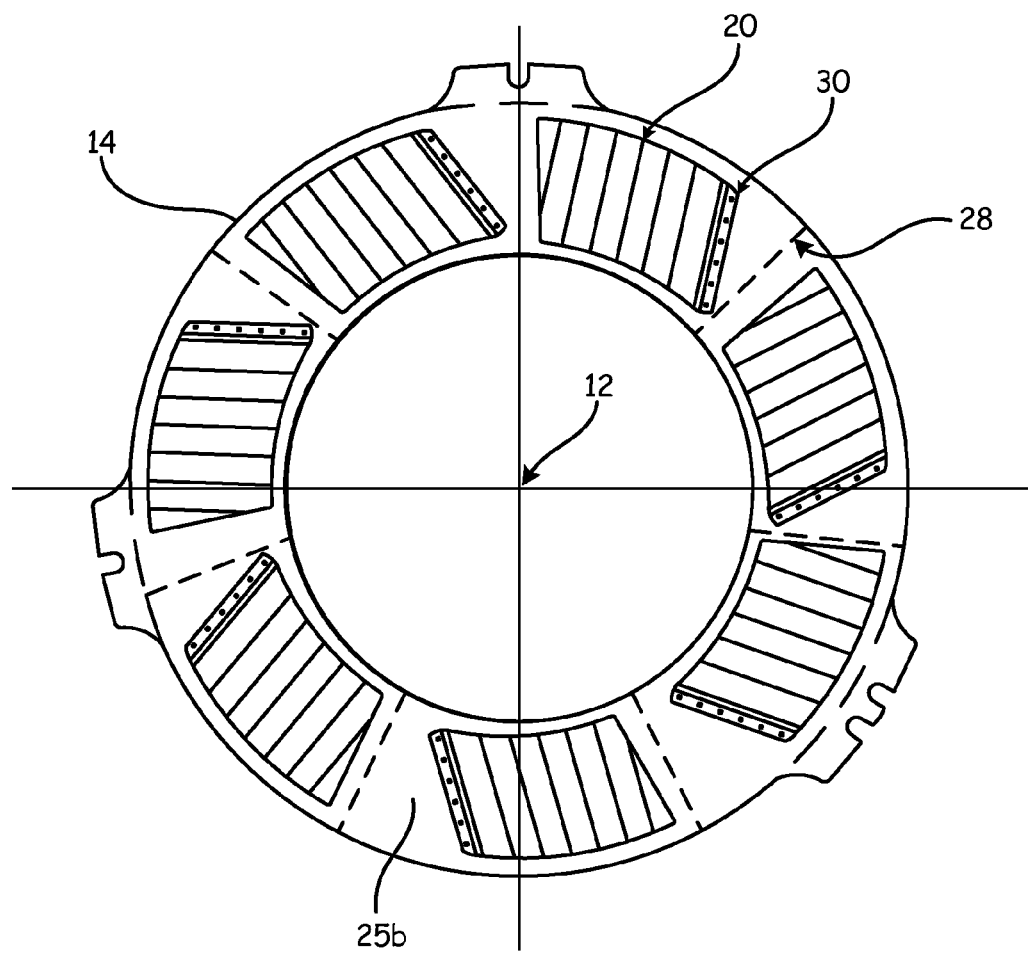
FIG. 3 is a plan view of the thrust bearing in FIG. 1 that shows the bumper foil face.

FIG. 3 is a plan view of thrust bearing 10 in which the configuration of bumper foils 20 can be better appreciated. Each bumper foil 20 is corrugated and has an arcuate shape defined by an inner radius, an outer radius, a thickness, and a corrugation profile. The arcuate shape of each bumper foil 20 has a centerline that is coincident with axis 12 and is positioned opposite a corresponding bearing foil 18 (not shown in FIG. 3) as indicated by hidden split lines 28, which show the division of each corresponding bearing foil 18 (not shown in FIG. 3). Each bumper foil 20 is attached to annular plate 14 at a single end 30, end 30 being oriented such that circumferential load tends to place each bumper foil 20 in tension with annular plate 14. End 30 is also orientated to minimize distortions caused by the process used to attach bumper foil 20 to annular plate 14. In some embodiments, end 30 is not radial (as shown in FIG. 3) and is not coincident with hidden split line 28 of corresponding bearing foil 18. Such an arrangement minimizes distortions to annular plate 14 caused by attaching bearing foils 18 (not shown) and bumper foils 20. The inner and outer radii of each bumper foil 20 do not extend to the inner and outer edges of annular plate 14, but instead, form a clearance between the inner and outer radii of bumper foils 20 and the respective inner and outer edges of annular plate 14. Bumper foils 20 are also constructed from one of several metallic materials that can withstand the temperature and structural loads imposed on thrust bearing 10 during operation. Suitable metallic materials include AMS 5598. Typically, the foil stock from which bumper foils 20 are constructed is greater than or equal to 0.002 inches and less than or equal to 0.006 inches. Preferably, the thickness of bumper foils 20 is 0.003 inches, although as with bearing foils 18, other thicknesses can be used.

As will be further discussed with reference to FIG. 4, bumper foils 20 have corrugations, the peak-to-peak height generally being greater than or equal to 0.015 inches and less than or equal to 0.030 inches. Preferably, the peak-to-peak height of bumper foils 20 is greater than or equal to 0.020 inches and less than or equal to 0.025 inches. The distance between peaks in a generally longitudinal direction or pitch can be selected to achieve a particular spring stiffness, the spring stiffness being selected and being dependent upon the axial load imposed on thrust bearing 10 and the assembly requirements of thrust bearing 10. Suitable spring stiffness can be achieved if, when installed, thrust bearing 10 imposes a preload on the mating parts, and when operating, bumper foils 20 do not completely compress. This arrangement allows for thrust bearing 10 to have a preload while still providing some axial damping when it is operating. Insufficient spring stiffnesses will cause bumper foils 20 to yield under load, flattening the corrugated profile. In some embodiments, the distance between peaks can be greater than or equal to 0.060 inches and less than or equal to 0.0180 inches. Moreover, the distance between peaks can vary according to the corrugation pattern for customizing the spring stiffness.

Figure 4:
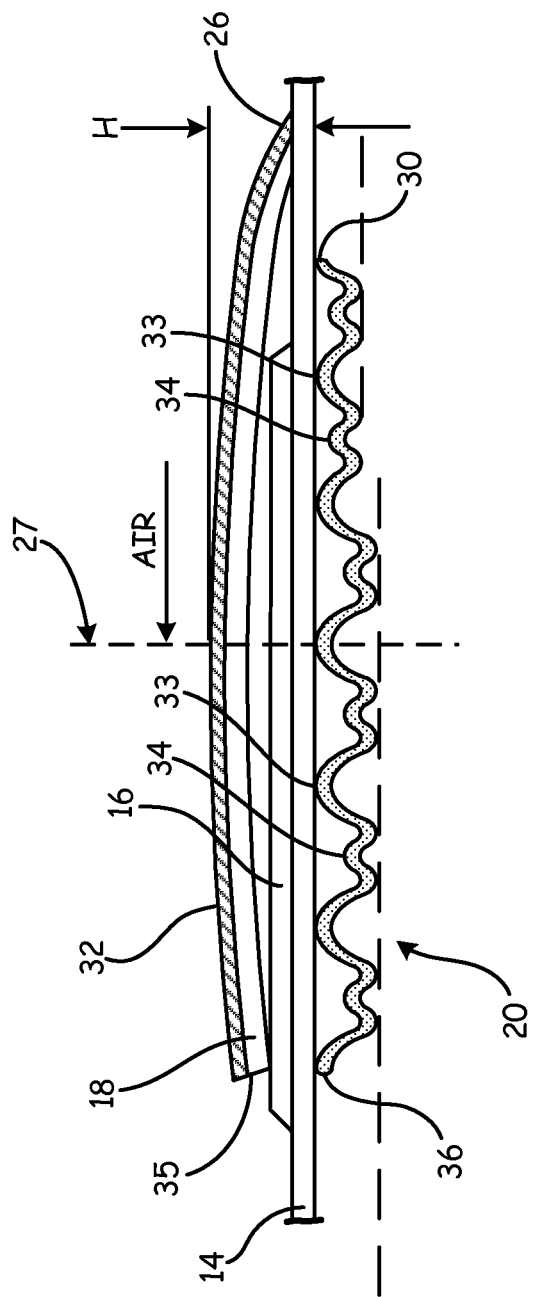
FIG. 4 is a partial side view of the thrust bearing of FIG. 1.

FIG. 4 is a partial end view of thrust bearing 14 that illustrates the relationship among bearing components and additional features of thrust bearing 10. The reference numbers in prior figures refer to the same components in FIG. 4.

For instance, bearing foil 18 can have friction-reducing material 32 applied to its outward face relative to annular plate 14 or sometimes called the load-bearing face. Friction-reducing material 32 has static and dynamic coefficients of friction that are less than the frictional coefficients of bearing foil 18. In some embodiments, material 32 is polytetrafluoroethylene (PTFE) having a static coefficient of friction between 0.03 and 0.10. Friction-reducing material 32 reduces wear on bearing foil 18 when the rotation of the thrust runner (shown in FIG. 5) relative to thrust bearing 10 is not sufficient to form a hydrodynamic fluid film, causing the thrust runner to bear directly on bearing foils 18. Friction-reducing material 32 can have a surface finish that is less than or equal to 16 microinches (arithmetic average surface finish).

Bearing foil 18 can also have a curvature displacing a portion of bearing foil 18 in an axial direction to promote the formation of the hydrodynamic fluid film and to reduce distortions of bearing foil 18 in the radial direction. The curvature of bearing foil 18 forms a peak at radial partition line 27 such that bearing foil 18 has maximum height H with respect to annular plate 14. In some embodiments, maximum height H is manufactured to be greater than or equal to 0.015 inches and less than or equal to 0.030 inches. After attaching bearing foil 18 to annular plate 14, maximum height H can be compressed to approximately 0.010 inches.

Bumper foil 20 has a corrugation profile that can include a series of constant corrugation peaks and valleys, or as shown in FIG. 4, a series of major peaks 33 and minor peaks 34. In one embodiment, the corrugation profile can include major peaks 33 having an axial height with respect to annular plate 14 greater than or equal to 0.015 inches and less than or equal to 0.030 inches. The minor peaks of the corrugation profile can have an axial height with respect to annular plate 14 greater than or equal to 0.010 inches and less than or equal to 0.015 inches. The corrugation profile can be linear and can have alternating major peaks 33 and minor peaks 34 at locations displaced from bumper foil end 30 as shown in FIG. 4, the linear corrugation profile being oriented in a generally circumferential direction. Adjacent to end 30, additional major peaks 33 having an axial height approximately 0.005 inches less than the remaining major peaks 33 can be used to assist hydrodynamic air film formation.

Spacer 16 can have a shape that contributes to the formation of the hydrodynamic fluid film. Typically, spacer 16 has a maximum axial thickness that is greater than or equal to 0.003 inches and less than or equal to 0.005 inches. Preferably, the axial thickness of spacer 16 is approximately 0.004 inches, although spacer 16 can be implemented with a thicker axial thickness.

Bearing foil 18 and bumper foil 20 each have free ends 35 and 36 opposite radially-extending end 26 and bumper foil end 30 respectively. Free ends 35 and 36 allow thermal and mechanical movements of foils 18 and 20, which can increase service life of thrust bearing 10.

Figure 5:
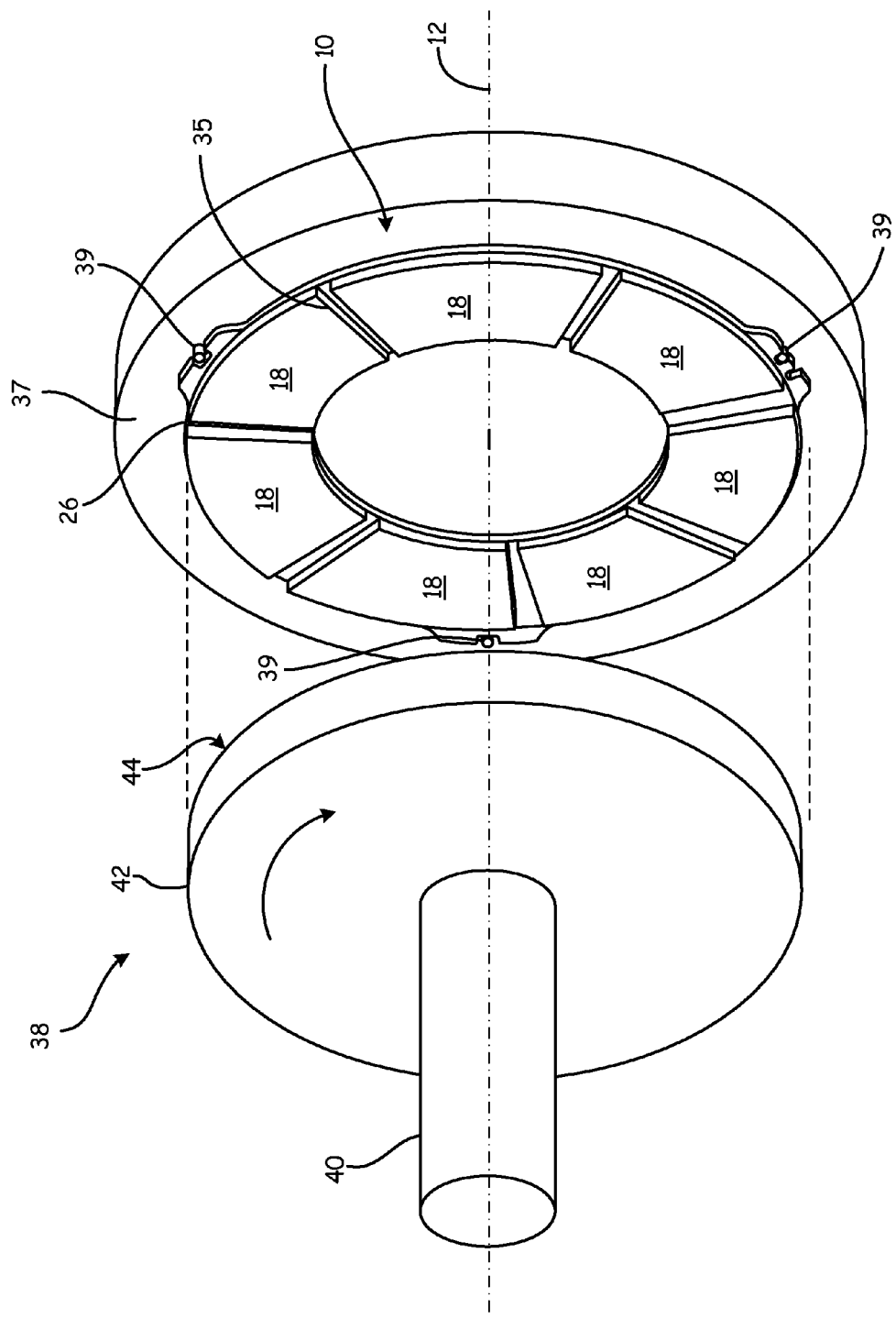
FIG. 5 is a perspective view of an installed thrust bearing of FIG. 1.

FIG. 5 is a perspective view of thrust bearing 10 in an installed condition. Thrust bearing 10 is arranged between housing 37 and thrust runner 38. Housing 37 is stationary and has locating pins 39 affixed to it that engage thrust bearing 10 at slots 24, 24a, and 24b. Thrust runner 38 is rotatable about axis 12 and includes shaft 40 and disk 42. Disk 42 can be integrally formed with shaft 40 or it can be an individual component affixed to shaft 40. Disk 42 includes thrust bearing surface 44, surface 44 being coated with a wear-resistant material such as chrome plating. In some embodiments, the chrome plating surface finish is less than or equal to 8 microinches (arithmetic average surface finish).

Although thrust bearing 10 is typically installed between rotating and stationary components, it could also be installed between two components in which the first component has a rotational speed relative to the second component. Relative rotation between thrust bearing 10 and the first rotating component is required to form a hydrodynamic fluid film between bearing foils 18 and the first rotating component.

Thrust runner 38 rotates in a clockwise direction when viewed from shaft 40 looking towards thrust bearing 10. Clockwise rotation of thrust runner 38 imposes a circumferential force on thrust bearing 10 such that bearing foils 18 and bumper foils 20 (not shown in FIG. 5) are placed in tension. In other words, thrust runner 38 rotates from radially-extending end 26 towards an opposing free end 35 for each bearing foil 18. Relative rotation between thrust bearing 10 and thrust runner 38 is required to form a hydrodynamic fluid film between bearing foils 18 and thrust runner 38. Although thrust bearing 10 is described to mate with thrust runner 38 and configured for clockwise rotation, thrust bearing 10 could be configured for counterclockwise rotation of thrust runner 38 by attaching the end of bearing foil 18 opposite radially-extending end 26 to annular plate 14.

Figure 6:
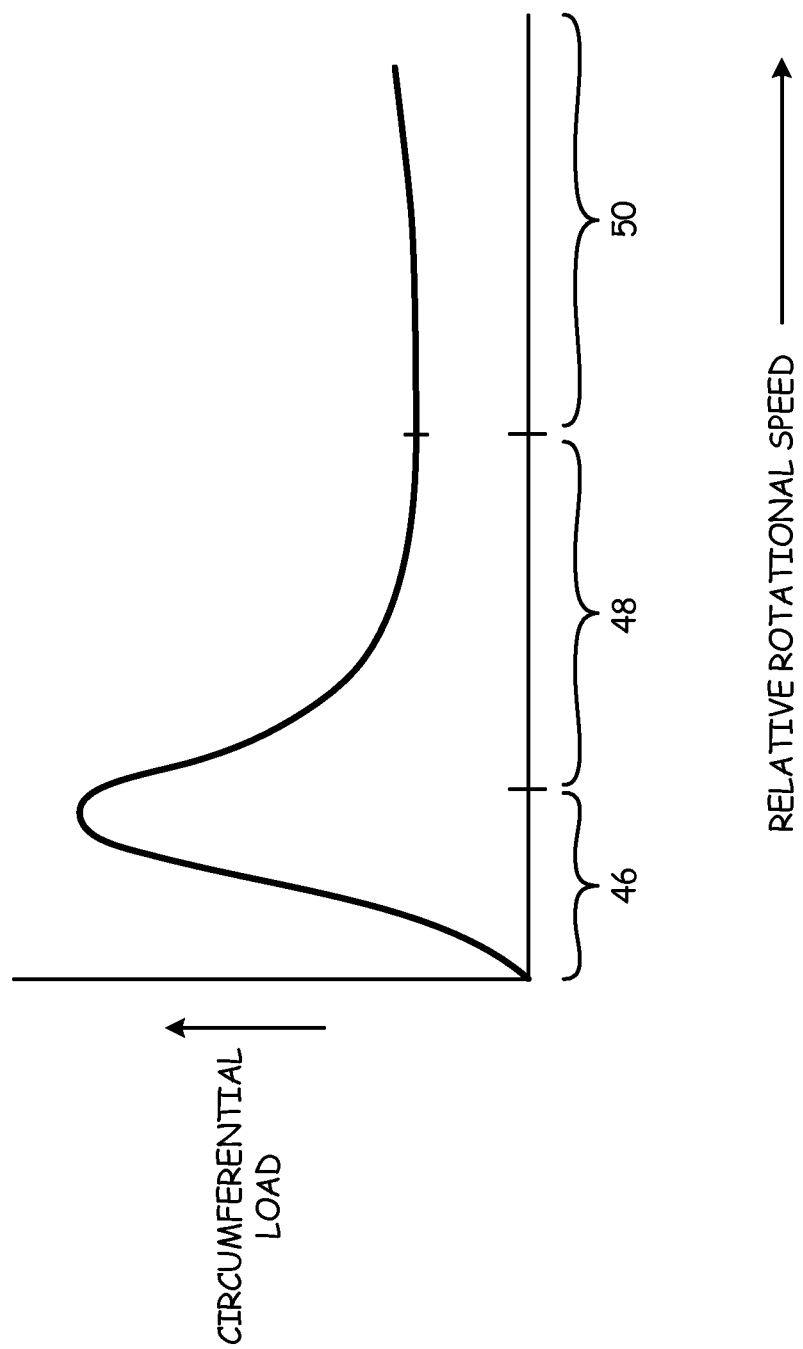
FIG. 6 is a chart showing the circumferential load or torque imposed on the thrust bearing as a function of rotational speed.

FIG. 6 is a chart showing the circumferential load or torque on thrust bearing 10 as a function of relative rotational speed between thrust runner 38 and thrust bearing 10. Referring to FIG. 6, rotational speed increases along the horizontal axis while circumferential load increases along the vertical axis. The operation of thrust bearing 10 can be described with reference to three rotational speed zones; hard contact region 46, hydrodynamic fluid film region 48, and high speed region 50. In hard contact region 46, thrust bearing 10 does not have a hydrodynamic fluid film. Without a hydrodynamic fluid film, bearing foils 18, being coated with friction-reducing material 32, are in direct contact with bearing surface 44 of disk 42. As the relative rotation between thrust runner 38 and thrust bearing 10 increases, the circumferential load approaches a maximum. Once the relative rotation between thrust runner 38 and thrust bearing 10 approaches a minimum value, a hydrodynamic fluid film forms between bearing foils 18 and thrust runner 38. As the relative rotational speed increases, the pressure of the hydrodynamic fluid film increases causing a subsequent decrease of circumferential load. As the relative rotational speed approaches an optimum value, the circumferential load approaches a minimum value. High speed region 50 is denoted by a gradual increase in circumferential load as rotational speed increases. Typically, the hydrodynamic fluid is either air or lubricating oil. In the embodiment shown in FIG. 1, the hydrodynamic fluid is air. Some of the advantages of hydrodynamic fluid film bearings include increased axial load capacity at higher rotational speeds caused by increased fluid film pressures and minimum contact.

Figure 7:
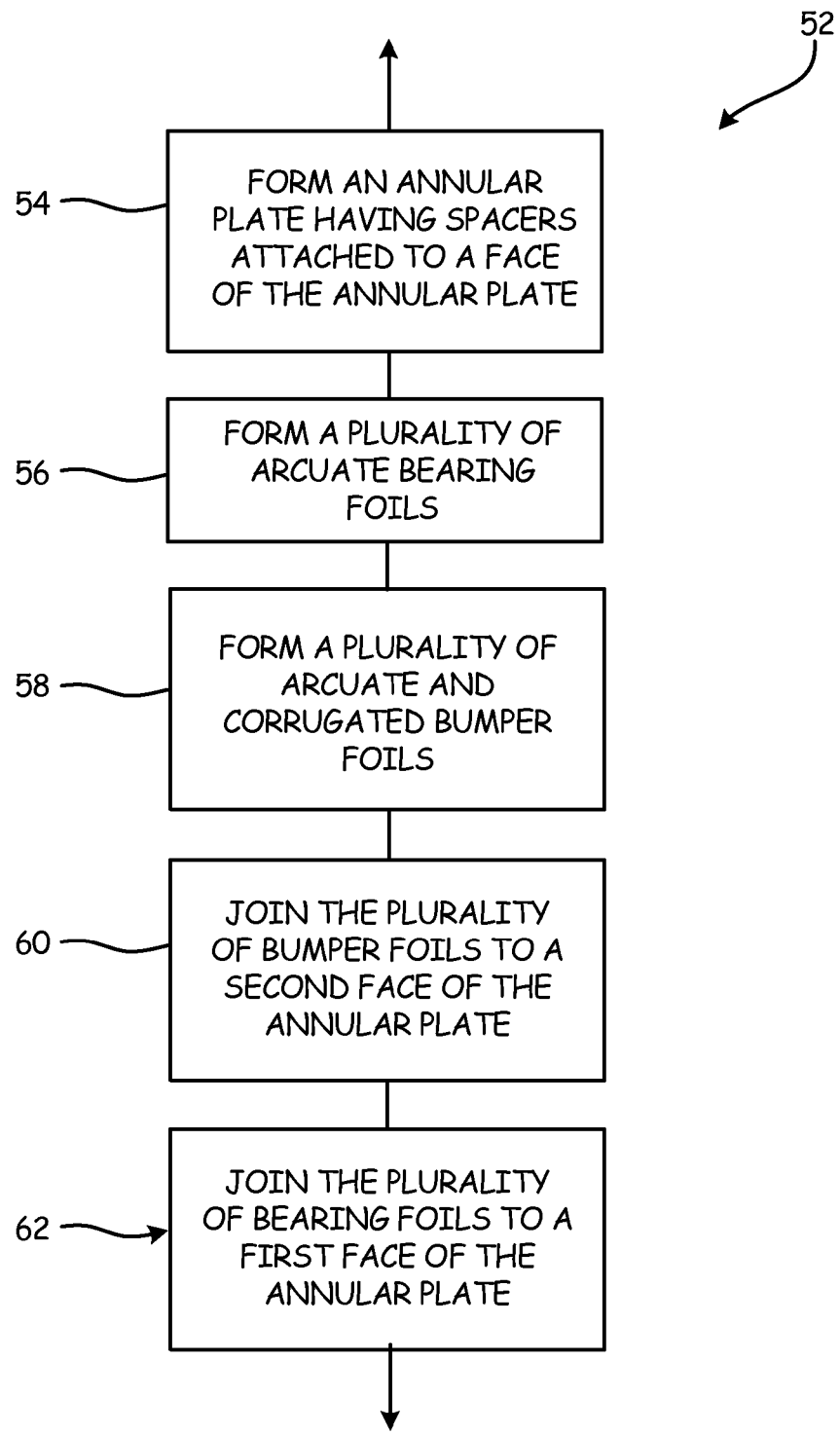
FIG. 7 is a flow chart describing a method of making the thrust bearing of FIG. 1.

FIG. 7 is a flow chart describing a method 52 of making thrust bearing 10. Method 52 of making thrust bearing 10 includes steps 54, 56, 58, 60, and 62. Step 54 includes forming annular plate 14 having spacers 16 attached to a face of annular plate 14. Steps 56 and 58 include forming two or more bearing foils 18 and two or more bumper foils 20. Step 60 includes joining bumper foils 20 to a second side of annular plate 14. Step 62 includes joining bearing foils to an opposite first side of annular plate 14. Joining bumper foils 20 to annular plate 14 before bearing foils 18 prevents damage to friction-reducing material 32 (see FIG. 4) when it is used on bearing foils 18. Each bumper foil 20 is associated with a corresponding bearing foil 18.

Annular plate 14 can be formed using a chemical etching process in which temperature-regulated etching chemicals remove material to create the shape of annular plate 14. Forming annular plate 14 by using a chemical etching process has an advantage over using an EDM process because chemical etching does not create burrs on edges exposed to the chemical-etching chemicals, thereby removing the source of service-life-reducing crack sites.

Bearing foils 18 and bumper foils 20 can be attached to annular plate 14 using a welding process. Some welding processes input heat into annular plate 14 causing distortions. Distortions of thrust bearing 10 cause variations in shapes of bearing foils 18 and can hinder the formation of a hydrodynamic fluid film. However when resistive welding techniques are employed, heat-caused distortions can be reduced, preserving the intended geometry of bearing foils 18 and thrust bearing 10.

Bearing foils 18 can be formed from a single piece of foil stock, thereby reducing the cost and improving the efficiency of manufacturing thrust bearing 10. First, a piece of flat foil stock of suitable thickness is selected and coated with friction-reducing material 32. Friction-reducing material 32 is burnished to improve surface finish and to achieve a final thickness for each bearing foil 18. Next, bearing foils 18 that have an arcuate shape are punched from the flat foil stock using a die punching process. Then, each bearing foil 18 receives a curvature relative to radial partition line 27. Finally, a portion of friction-reducing material 32 is removed from radially-extending end 26, and bearing foil 18 is attached to annular plate 14 using a resistive welding process.

Discussion of Possible Embodiments

The following are non-exclusive descriptions of possible embodiments of the present invention.

A hydrodynamic thrust bearing has an annular plate, a plurality of bearing foils, and a plurality of bumper foils. The annular plate has a first face and a second face opposite the first face. The plurality of bearing foils has an arcuate shape and is joined to the first face of the annular plate. The plurality of bumper foils has a corrugated, arcuate shape and is joined to the second face of the annular plate.

The hydrodynamic thrust bearing can optionally include, additionally and/or alternatively, any one or more of the following features, configurations and/or additional components:

A further embodiment of the foregoing hydrodynamic thrust bearing, wherein the plurality of bearing foils can be joined to the first face of the annular plate at a single radially-extending end of each bearing foil.

A further embodiment of any of the foregoing hydrodynamic thrust bearings, wherein the plurality of bumper foils can be joined to the second face of the annular plate at a single end of each bumper foil.

A further embodiment of any of the foregoing hydrodynamic thrust bearings, wherein each of the plurality of bearing foils can have a friction-reducing material applied to a face of the bearing foil.

A further embodiment of any of the foregoing hydrodynamic thrust bearings, wherein the friction-reducing material is polytetrafluoroethylene.

A further embodiment of any of the foregoing hydrodynamic thrust bearings, wherein the plurality of bearing foils can have a curvature with respect to a radially-extending plane of each bearing foil. The curvature can displace each bearing foil at the radially-extending plane.

A further embodiment of any of the foregoing hydrodynamic thrust bearings, wherein the plurality of bumper foils can have a repeating corrugation pattern defined by one minor corrugation and one major corrugation.

A further embodiment of any of the foregoing hydrodynamic thrust bearings, wherein the first two minor corrugations and the first two major corrugations with respect to the single end of the bumper foil can be smaller in axial height than the remaining minor and major corrugations of the bumper foil.

A further embodiment of any of the foregoing hydrodynamic thrust bearings can further include a housing, a plurality of locking elements, a shaft, and a disk. The plurality of locking elements can be affixed to the housing and can engage the annular plate. The shaft can be rotatable with respect to the housing. The disk can be concentrically joined to a first end of the shaft. The disk can have a wear-resistant material bonded to a bearing face of the disk and can be disposed such that the plurality of bearing foils contact the wear-resistant material.

A method of making a hydrodynamic thrust bearing includes forming an annular plate, forming a plurality of arcuate bearing foils, forming a plurality of arcuate and corrugated bumper foils, joining the plurality of bumper foils to the second face of the annular plate, and joining the plurality of bearing foils to the first face of the annular plate. The first face of the annular plate can be opposite the second face of the annular plate. Each of the plurality of bearing foils can be associated with one of the plurality of spacers, and each of the plurality of bumper foils can correspond to an opposing bearing foil.

The method of making a hydrodynamic thrust bearing can optionally include, additionally and/or alternatively, any one or more of the following features, configurations and/or additional components:

A further embodiment of the foregoing method, wherein the annular plate and the plurality of spacers are formed by a chemical etching process.

A further embodiment of any of the foregoing methods, wherein the plurality of bearing foils can be formed from a foil stock by bonding a friction-reducing material to a side of the foil stock, burnishing the friction-reducing material to achieve a foil thickness, and separating a plurality of arcuate bearing foils from the foil stock.

A further embodiment of any of the foregoing methods, wherein each bearing foil can have a curvature forming a peak at a radially-extending plane of each bearing foil.

A further embodiment of any of the foregoing methods, wherein the plurality of bearing foils and the plurality of bumper foils can be joined to the annular plate at a single end of each by a resistive weld process.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hydrodynamic thrust bearing comprising:
   an annular plate having a first face and a second face opposite the first face;
   a plurality of bearing foils having an arcuate shape, wherein the plurality of bearing foils are joined to the first face of the annular plate; and
   a plurality of bumper foils having a corrugated, arcuate shape, wherein the plurality of bumper foils are joined to the second face of the annular plate.

2. The hydrodynamic thrust bearing of claim 1 wherein the plurality of bearing foils are joined to the first face of the annular plate at a single radially-extending end of each bearing foil.

3. The hydrodynamic thrust bearing of claim 2 wherein the plurality of bearing foils each have a friction-reducing material applied to a face of the bearing foil.

4. The hydrodynamic thrust bearing of claim 3 wherein the friction-reducing material is polytetrafluoroethylene.

5. The hydrodynamic thrust bearing of claim 2 wherein the plurality of bearing foils have a curvature with respect to a radially-extending plane of each bearing foil, the curvature axially displacing each bearing foil at the radially-extending plane.

6. The hydrodynamic thrust bearing of claim 1 wherein the plurality of bumper foils are joined to the second face of the annular plate at a single end of each bumper foil.

7. The hydrodynamic thrust bearing of claim 1 wherein the plurality of bumper foils has a repeating corrugation pattern defined by one minor corrugation and one major corrugation.

8. The hydrodynamic thrust bearing of claim 7 wherein the first two minor corrugations and the first two major corrugations with respect to the single end of the bumper foil are smaller in axial height than the remaining minor and major corrugations of the bumper foil.

9. The hydrodynamic thrust bearing of claim 1 and further comprising:
a plurality of spacers integral with the annular plate and disposed such that each of the plurality of spacers is located between one of the plurality of bearing foils and the first face of the annular plate.

10. The hydrodynamic thrust bearing of claim 1 and further comprising:
a housing;
a plurality of locking elements affixed to the housing and engaging the annular plate;
a shaft rotatable relative to the housing; and
a disk concentrically joined to a first end of the shaft, wherein the disk has a wear-resistant material bonded to a bearing face and is disposed such that the plurality of bumper foils contact the housing and the plurality of bearing foils contact the wear-resistant material.

11. The hydrodynamic thrust bearing of claim 1, wherein the first surface is spaced from the second surface to define a thickness of the annular plate.

12. A method of making a hydrodynamic thrust bearing, the method comprising:
forming an annular plate having a first face and a second face opposite the first face, wherein a plurality of spacers are integrally formed on a portion of the first face;
forming a plurality of arcuate bearing foils;
forming a plurality of arcuate and corrugated bumper foils;
joining the plurality of bumper foils to the second face of the annular plate, wherein each bumper foil corresponds to an opposing bearing foil; and
joining the plurality of bearing foils to the first face of the annular plate, wherein each bearing foil is associated with one of the plurality of spacers.

13. The method of claim 12 wherein the annular plate and the plurality of spacers are formed by a chemical etching process.

14. The method of claim 12 wherein the plurality of arcuate bearing foils are formed from a foil stock by bonding a friction-reducing material to a side of the foil stock, burnishing the friction-reducing material to achieve a foil thickness, and separating a plurality of arcuate bearing foils from the foil stock.

15. The method of claim 14 wherein each bearing foil has a curvature forming a peak at a radially-extending mid-plane of each bearing foil.

16. The method of claim 12, wherein the plurality of bearing foils and the plurality of bumper foils are each joined to the annular plate at a single end by a resistive weld process.

17. A hydrodynamic thrust bearing comprising:
an annular plate having a first face and a second face opposite the first face;
a plurality of bearing foils having an arcuate shape, wherein the plurality of bearing foils are joined to the first face of the annular plate; and
a plurality of bumper foils having a corrugated, arcuate shape, wherein the plurality of bumper foils are joined to the second face of the annular plate, wherein the plurality of bumper foils has a repeating corrugation pattern defined by one minor corrugation and one major corrugation.

18. The hydrodynamic thrust bearing of claim 17, wherein the plurality of bearing foils each have a friction-reducing material applied to a face of the bearing foil.

19. The hydrodynamic thrust bearing of claim 18, wherein the plurality of bearing foils are joined to the first face of the annular plate at a single radially-extending end of each bearing foil, and wherein the plurality of bearing foils have a curvature with respect to a radially-extending plane of each bearing foil, the curvature axially displacing each bearing foil at the radially-extending plane.

20. The hydrodynamic thrust bearing of claim 19 and further comprising:
a plurality of spacers integral with the annular plate and disposed such that each of the plurality of spacers is located between one of the plurality of bearing foils and the first face of the annular plate.

* * * * *